Patented Jan. 10, 1933

1,893,870

UNITED STATES PATENT OFFICE

SAMUEL PALKIN, OF WASHINGTON, DISTRICT OF COLUMBIA, AND HOWARD R. WATKINS, OF SOMERSET, MARYLAND

PROCESS FOR THE PURIFICATION AND PRESERVATION OF ETHER

No Drawing.  Application filed May 21, 1928. Serial No. 279,626.

(GRANTED UNDER THE ACT OF MARCH 3, 1883, AS AMENDED APRIL 30, 1928; 370 O. G. 757)

This application is made under the act of March 3, 1883, as amended April 30, 1928, and the invention herein described, if patented, may be manufactured and used by or for the Government for governmental purposes without payment to us of any royalty thereon.

This invention relates to methods for the purification and preservation of ether by the employment of antioxidants in alkaline solutions, the solutions preferably being distributed or absorbed in asbestos or other suitable absorptive material so as to be brought freely into contact with the ether.

In the operation of one form of our invention a solution of alkali is prepared, about one part of alkali in two parts of water being used. Pyrogallol is dissolved in this solution to the extent of about five parts of pyrogallol to 75 parts of the strong alkali solution. Purified asbestos fiber is then placed in the alkaline pyrogallol solution in a quantity sufficient to absorb the alkaline pyrogallol solution and leave the resulting mass in a thoroughly dampened but more or less loose form when suspended in ether. A small portion (5 gm.) of this alkaline-pyrogallol-asbestos-preservative is added to about 300 cc. of ether in containers such as bottles or metallic cans.

The process set forth in the paragraph next preceding represents a method of preservation of ether.

Our process of purification of ether, to render it suitable for anesthesia, is as follows: Ether contaminated with peroxide, aldehydes, acid, etc., is placed in a suitable vessel over prepared alkaline-pyrogallol-asbestos and distilled into another vessel in a way to force it through a solution of alkaline pyrogallol. Any suitable apparatus may be used, but we prefer to use apparatus in principle like that described in Ind. & Eng. Chem. vol. 17, 612 (1925) by Palkin, Murray and Watkins.

We have found that ether purified in the manner described and stored in vessels of glass, brown or white, and in tin-lined cans in contact with these preservatives has not developed aldehydes, acids or peroxides even when kept in warm places or exposed to direct sunlight. Such ether also was found to conform to the other tests prescribed for U. S. P. ether.

We define "antioxidant compound", as used herein, as an aqueous solution of any reducing substance and strong alkali that in ether prevents the existence therein of impurities, such as oxygen, peroxides, aldehydes, and acid, and does not itself contaminate the ether. Such a reducing substance may be pyrogallol, or other phenolic substance capable of reacting with or absorbing oxygen, or of destroying peroxides. The use of an agent like pyrogallol, a strong anti-oxidant, incorporated in strong alkali, is based on the fact that pyrogallol in the free state, without alkali, contaminates the ether, but when fixed by a strong akali no contamination with the purification agent would result.

The use of alkali has the further advantage that aldehydes are thus removed and any acids formed are automatically neutralized.

It will be understood that any other means whereby the preservative agent may be brought, in a sufficient degree, into contact with the ether, may be employed.

The use of the antioxidant compound without alkali may be of value to some extent in the purification and preservation of ether but we use alkali with it in order to serve the purpose of removing or preventing the formation of impurities other than peroxide and, in addition, in the case of pyrogallol and other phenolic preservatives, to prevent their solution in the ether.

We define contaminated ether as ether which contains such impurities as aldehydes, peroxide, acid or other substances removable by distillation or, stated otherwise, it includes impurities that may be present in process of manufacture or which may develop in the storage of ether.

We claim:

1. A method for the purification of contaminated ether comprising the subjection of said ether to the action of pyrogallol dissolved in a solution of alkali.

2. A method for the purification of contaminated ether comprising the subjection of said ether to the action of pyrogallol dissolved in a solution of alkali distributed throughout a mass of absorptive material.

3. A method for the purification of contaminated ether comprising the subjection of said ether to the action of a solution of alkali and pyrogallol, the alkali and pyrogallol being present in asbestos.

4. A process for the preservation of ether by means of packaging the said ether in contact with an aqueous alkaline solution of pyrogallol associated with absorptive material.

5. A process for the preservation of ether comprising the packaging of said ether in contact with an aqueous alkaline solution of pyrogallol incorporated in asbestos.

6. A process for the purification of contaminated ether comprising the subjection of said ether to the action of an aqueous alkaline solution of pyrogallol associated with absorptive material.

7. A process for the purification of contaminated ether comprising the subjection of said ether to the action of an aqueous alkaline solution of pyrogallol incorporated in asbestos.

SAMUEL PALKIN.
HOWARD R. WATKINS.